United States Patent
Cui et al.

(10) Patent No.: US 9,393,646 B2
(45) Date of Patent: *Jul. 19, 2016

(54) MAGNETIC NICKEL BASE TERNARY BRAZING MATERIAL AND METHOD OF APPLICATION

(71) Applicant: GENERAL ELECTRIC COMPANY, Schenectady, NY (US)

(72) Inventors: Yan Cui, Greer, SC (US); Dechao Lin, Greer, SC (US); Srikanth Chandrudu Kottilingam, Simpsonville, SC (US); Brian Lee Tollison, Honea Path, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 513 days.

This patent is subject to a terminal disclaimer.

(21) Appl. No.: 13/765,177

(22) Filed: Feb. 12, 2013

(65) Prior Publication Data

US 2014/0227550 A1    Aug. 14, 2014

(51) Int. Cl.
| | | |
|---|---|---|
| *C22C 19/05* | (2006.01) | |
| *B23K 31/00* | (2006.01) | |
| *B23K 35/30* | (2006.01) | |
| *B23K 35/02* | (2006.01) | |
| *C22C 30/00* | (2006.01) | |
| *C22C 30/02* | (2006.01) | |
| *C22C 19/03* | (2006.01) | |
| *C22C 19/07* | (2006.01) | |

(52) U.S. Cl.
CPC ......... *B23K 35/3033* (2013.01); *B23K 35/0222* (2013.01); *B23K 35/0244* (2013.01); *B23K 35/30* (2013.01); *B23K 35/304* (2013.01); *B23K 35/3046* (2013.01); *C22C 19/03* (2013.01); *C22C 19/05* (2013.01); *C22C 19/07* (2013.01); *C22C 30/00* (2013.01); *C22C 30/02* (2013.01); *Y10T 428/12* (2015.01); *Y10T 428/12431* (2015.01)

(58) Field of Classification Search
CPC ........ C22C 19/05; C22C 19/03; C22C 38/30; C22C 38/10; C22C 30/00; B23K 31/02; B23K 35/306; B23K 35/3066; B23K 35/3033
USPC .......................................................... 420/440
See application file for complete search history.

(56) References Cited

U.S. PATENT DOCUMENTS

| | | | |
|---|---|---|---|
| 2,880,086 A | | 3/1959 | Cape |
| 3,241,607 A | * | 3/1966 | Rutledge ................ 165/166 |
| 3,418,111 A | * | 12/1968 | Herchenroeder ........... 420/440 |
| 4,402,742 A | | 9/1983 | Pattanaik |
| 4,528,247 A | | 7/1985 | Mizuhara |
| 7,156,280 B1 | * | 1/2007 | Jiang et al. ................ 228/56.3 |
| 2009/0130483 A1 | | 5/2009 | Hartmann et al. |
| 2009/0140030 A1 | * | 6/2009 | Amancherla et al. ......... 228/208 |
| 2010/0028716 A1 | | 2/2010 | Nuetzel et al. |

FOREIGN PATENT DOCUMENTS

EP        2279826 A1    2/2011

OTHER PUBLICATIONS

European Search Report and Written Opinion issued in connection with corresponding EP Application No. 14154041.9-1362 on May 14, 2014.
"Vacuum Brazing Techniques Part 4—Vacuum Brazing Cycles", VAC AERO International, Inc., VAC AERO News, Education &Training,News & Announcements,Products News & Training announcement http://vacaero.com/information-resources/vac-aero-news-and-training/products-news-traini . . . Jan. 13, 2016.
"Brazing of CMSX-4 with a Boron-and Silicon-Free Ni—Co—Zr—Hf—Cr—Ti—Al Brazing Alloy", Welding Journal, Jul. 2014, vol. 93, pp. 233-242; Supplement to the Welding Journal, Jul. 2014, Sponsored by the American Welding Society and the Welding Research Council http://www.globalspec.com/supplier/profile/AmericanWeldingSociety.

* cited by examiner

*Primary Examiner* — Jessee Roe
(74) *Attorney, Agent, or Firm* — McNees Wallace & Nurick LLC (57) ABSTRACT

A ternary magnetic braze alloy and method for applying the braze alloy in areas having limited access. The magnetic braze alloy is a nickel-based braze alloy from the perminvar region of the Ni, Fe, Co phase diagram. The braze alloy includes, by weight percent 8-45% Fe, 0-78% Co, 2.0-4.0% of an element selected from the group consisting of B and Si and combinations thereof, and the balance Ni. The nickel-based braze alloy is characterized by a brazing temperature in the range of 1850-2100° F. The nickel-based braze alloy is magnetic below its Curie temperature.

25 Claims, 6 Drawing Sheets

MAGNETIC NICKEL BASE TERNARY BRAZING MATERIAL AND METHOD OF APPLICATION

FIELD OF THE INVENTION

This invention relates to magnetic ternary brazing alloy and specifically to a method of applying a braze material to accomplish a repair to a difficult to access location.

BACKGROUND OF THE INVENTION

Nickel-base and cobalt base alloys and their braze materials are non-magnetic in nature. Gas turbine components are complex in nature and they require joining processes to fabricate the components. Joining processes are also required to repair components after service. Brazing is frequently used to repair components. These repairs from time to time are required to repair defects that have developed in difficult to access locations in some of the components.

Gas turbine hot gas flow path components are often cooled and have complicated internal flow paths. Leaks between inlet and outlet circuits reduce the cooling efficiency leading to oxidation and premature failure of these components. When leaks develop between the circuits, they require correction. These leak paths may be liquid or gas leak paths. The leak paths may have developed as a result of service distress or may simply be the result of fabrication techniques for new parts. For example, casting techniques or welding operations may be the cause of the leak paths, and these techniques and operations may provide such defects in a repetitive manner. Casting techniques are known to produce porosity, and when the porosity is connected, not surprisingly, leak paths may form. Regardless of how the leak paths form, the leak paths must be eliminated or the component may require removal from service.

In many circumstances, repair of defects can be accomplished with standard nickel base or cobalt base brazing material, such as when the defects are readily accessible. However, in many situations, defects may develop in less than desirable locations, making standard repair procedures difficult or impossible. For example, the defect may be in a difficult to reach location, and the available braze alloys that may be used either cannot be properly moved into the location to effect repair or may not have the necessary properties to survive the environmental conditions at the position at which the repair is required.

What is needed is a braze repair material that can withstand harsh environmental conditions that may be experienced in certain components and that readily can be moved to a position to effect repair of the component when standard braze materials cannot be utilized to accomplish the repair.

BRIEF DESCRIPTION OF THE INVENTION

A ternary braze alloy comprises a nickel-based braze alloy selected from the perminvar region of the nickel (Ni), iron (Fe), cobalt (Co) phase diagram. The braze alloy includes, in weight percent about 8% to 45% by weight iron (Fe), about 0% to 78% by weight cobalt (Co), about 0.5-5% of an element selected from the group consisting of boron (B) and silicon (Si) and combinations thereof, and the balance nickel (Ni). The nickel-base braze alloy is characterized by a brazing temperature in the range of 1850-2100° F. The nickel-based braze alloy also is magnetic below its Curie temperature.

A method for repairing a defect in a structure is also set forth. The method encompasses the steps of identifying a defect in a component. The component may be part of a larger structure or it may be an independent structure. While the method set forth may be used for any repair, this method is particularly useful when the defect is positioned in a hard to access location, such as within a cavity within the component. Once the defect has been identified, the nickel-based braze alloy from the perminvar region of the nickel (Ni), iron (Fe), cobalt (Co) phase diagram is provided. This braze alloy, as set forth above includes, in weight percent, 8% to 45% by weight iron (Fe), 0% to 78% by weight cobalt (Co), 0.5-5.0% of an element selected from the group consisting of boron (B) and silicon (Si) and combinations thereof, and the balance nickel (Ni). The nickel-base braze alloy is characterized by a brazing temperature in the range of 1850-2100° F. The braze alloy is added to the hard to reach, and perhaps even impossible to reach area of the component. This may be an interior of the component. Even though the area may be difficult to access, this area may not be the area where the defect is located. The defect may be located in an area away from the access that is more difficult to reach, or perhaps even impossible to reach. The braze alloy now may be manipulating with a magnet so that it is positioned at the defect. The component now may be placed in a furnace, the furnace having an atmosphere that is substantially free of oxygen while maintaining the braze alloy in position. The furnace now is heated to the brazing temperature of the braze alloy. The braze alloy melts, at least partially and flows into the defect. If done properly, the molten braze alloy flows into the defect or imperfection. The component now may be cooled, either for use or for further processing.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
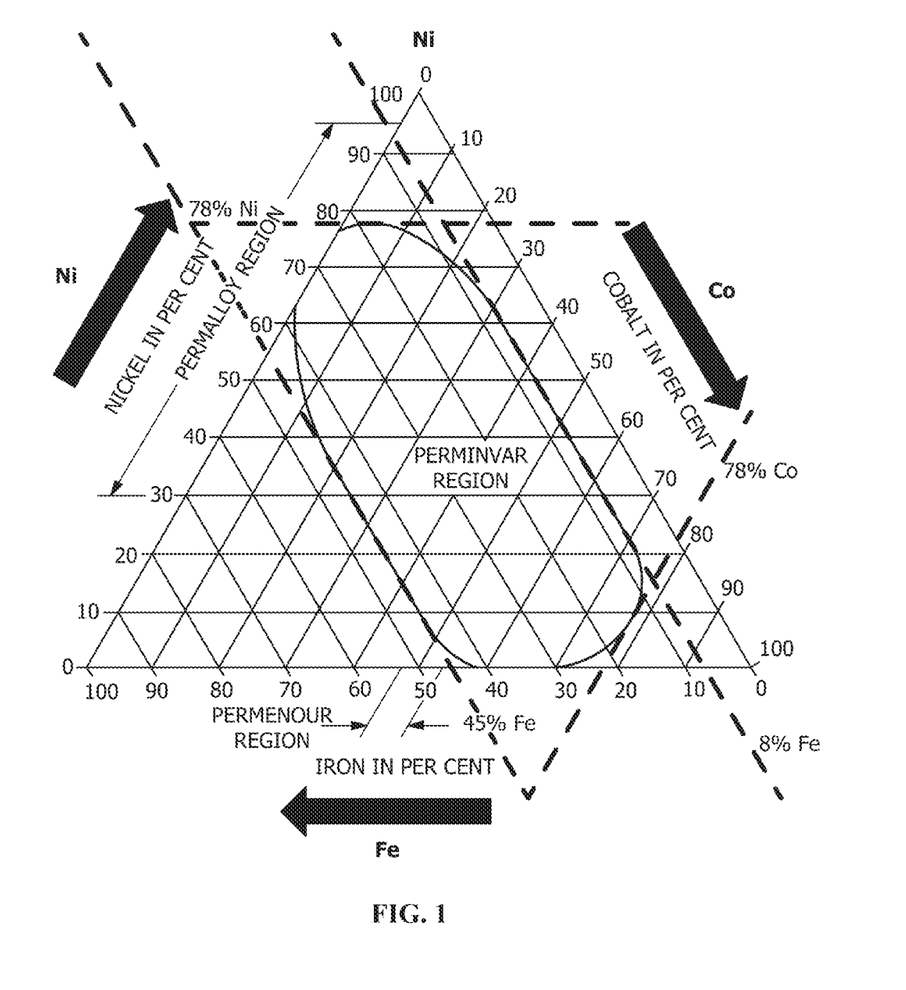
FIG. 1 is an isothermal of the Ni—Cr—Fe System depicting the perminvar region that includes the compositional range of the braze alloy of the present invention.

The present invention provides a magnetic braze alloy particularly useful for performing braze operations in hard to access locations on high temperature Ni, Fe and Co alloys. While the use of the braze alloy of the present invention is not so restricted, as it can be used in any application in which a brazing may be required, the braze alloy and its method of use provides a method for applying braze alloy in components having inaccessible or difficult to access positions. The braze alloy composition utilized for application of braze alloy in difficult to access or otherwise inaccessible locations broadly comprises a nickel-based braze alloy from the perminvar region of the Ni, Fe, Co phase diagram, in weight percent 8-45% Fe, 0-78% Co, 0.5-5.0% of an element selected from the group consisting of B and Si, preferably 2.0-4.0% of an element selected from the group consisting of B and Si and combinations and the balance Ni. Unless otherwise specified herein, all alloy compositions are provided in weight percent wt. %, w/o or simply %. The term "balance essentially nickel (Ni)" or "balance of the alloy essentially nickel" is used to include, in addition to Ni, small amounts of impurities and other incidental elements, some of which have been described above, that are inherent in a nickel-based braze material, which in character and/or amount do not affect the advantageous aspects of the alloy. The perminvar region of the Ni—Co—Fe ternary phase diagram is depicted in FIG. 1, which is an isothermal of the Ni—Co—Fe system. The braze alloy has a brazing temperature in the range of 1850-2100° F.

The braze alloy may also include additional materials to tailor its properties. For example, aluminum (Al) and/or titanium (Ti) may be added to increase the oxidation resistance and the strength of the alloy. Preferably, the braze alloy may include from 0.01-0.10% Al. The alloy also may preferably include from 0.01-0.10% Ti.

Boron (B) and/or silicon (Si) also may be added to the braze alloy to act as a melting point depressant. Boron (B), which is preferred, may be replaced or combined together with silicon (Si) to depress the melting point. While these rapidly diffusing elements act initially as a melting point depressant that lowers the melting point of the braze alloy, they quickly diffuse into the adjoining base material so that these elements rapidly diffuse as the braze alloy solidifies. The rapid diffusion of these elements, either alone or in combination, into surrounding material results in solidified braze material that has a melting temperature that is higher than that of the initial braze material prior to the braze operations. Boron (B) and silicon (Si) may be included alone or in combination from about 0.5-5.0%, preferably from about 2.0-4.0% and most preferably in amounts of from about 2.75-3.75%. Without the inclusion of a melting point depressant such as B and/or Si, the melting temperature of the magnetic material in the ternary system is about 2650° F. With the inclusion of boron in the braze alloy, the melting point of the ternary magnetic braze material is lowered to a brazing temperature in the range of from 1850° F. to about 2100° F. initially. The melting temperature of the braze alloy will increase as the rapidly diffusing melting point depressant element(s) diffuses into the base material at elevated temperatures.

The alloy may also include chromium (Cr) as an optional element. Chromium (Cr) is added to increase the resistance to oxidation and corrosion. Cr may also contribute to the paramagnetic and ferromagnetic properties of the braze alloy. Cr may be included in the braze alloy in amounts from 6-13%.

The braze alloy of the present invention may find use in performing repairs in hard to access locations or even impossible to access locations. For example, braze repair may be required in the leak path of a turbine nozzle due to porosity. Porosity in this location can result in the development of a leak path. The leak path may be a natural consequence of the sequence of operations in fabricating the nozzle. How the leak path is formed, however, is not an important part of this invention, as this invention closes the leak path once it is discovered. The leak path may be discovered as a result of a leak test, which may result in pressurizing the nozzle using a fluid at high pressures, or other non-destructive test. Because the leak path forms from the inner pressure boundary, where access may be restricted due to configuration, moving braze material to the precise leak location may be difficult. This nozzle is exemplary, as any other arrangement in which a defect is located in a remote, difficult to reach location, requiring repair that may be effected by a brazing operation is a candidate for the braze material of the present invention.

The braze material set forth herein solves the problem of accessibility to a repair area. As long as some accessibility is available, the braze material of the present invention, because of its magnetic properties, can be manipulated to the location of a leak or defect. Because the braze material is magnetic, it does not matter whether the base material requiring repair is also magnetic, as long as the base material has a melting point that is higher than that of the braze material. Thus, the braze material of the present invention can be utilized with most of the materials used in turbine applications. It can be used with ferrous alloys and superalloys, nickel-based alloy and superalloys, cobalt-based alloys and superalloys and combinations thereof.

Figure 2:
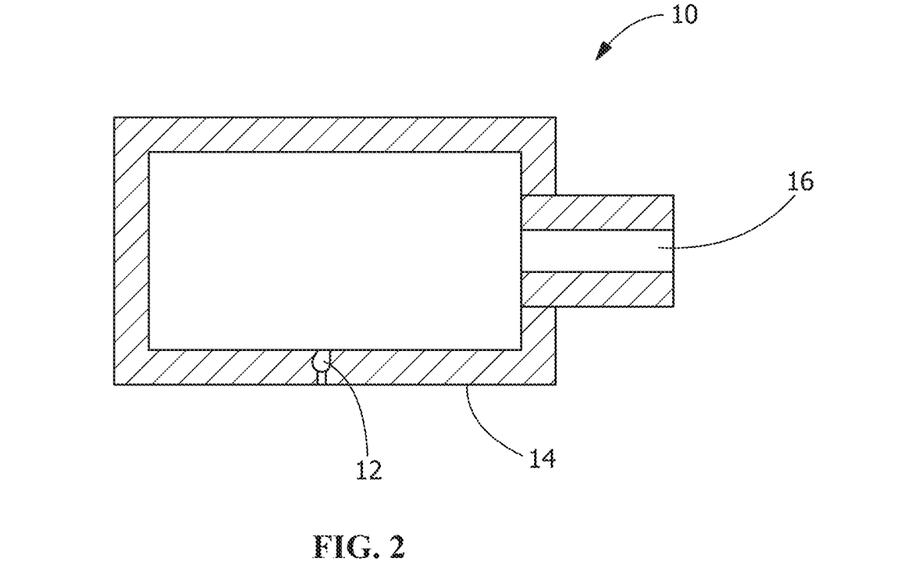
FIG. 2 is depicts a cross-section of a component, a nozzle, with a defect.

Referring now to FIG. 2, which is representative of a nozzle 10 having limited accessibility, a defect 12 is depicted in a nozzle wall 14. Defect 12 is depicted as porosity, but may be any type of defect that may occur in a metal structure, such as a cold shut or mis-run found in originally cast structures, incomplete joint penetration and incomplete fusion as may be found in welded structures, and cracks, or any other defect. In FIG. 2, the defect may be located by a non-destructive test, which may include visual inspection, ultrasonic inspection, hydro-testing, radiography, eddy current or any other non-destructive testing that can detect defects or imperfections in metal and locate their position for subsequent repair.

Figure 3:
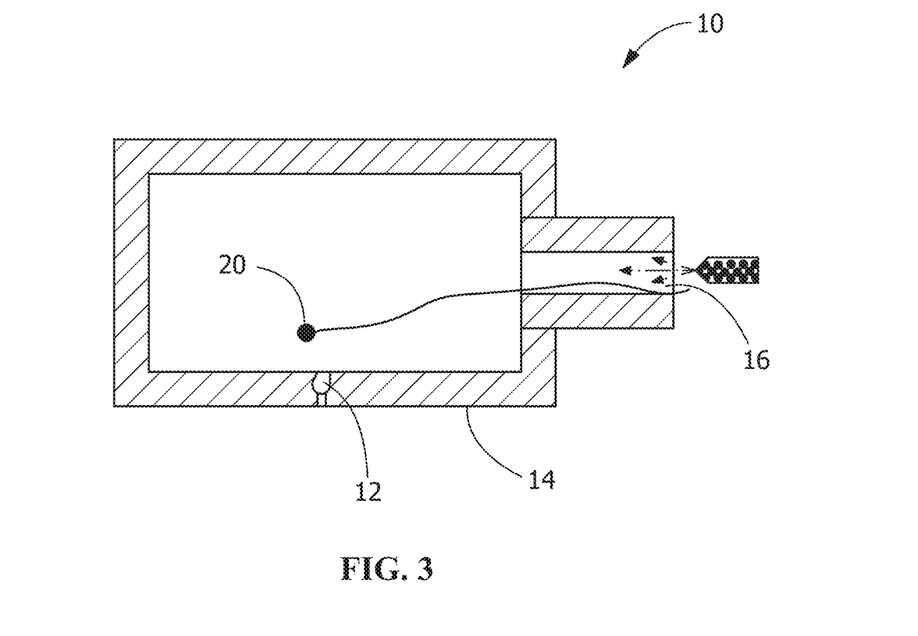
FIG. 3 is a cross-section of the component of FIG. 2 depicting braze alloy of the present invention being introduced into the component.
Figure 4:
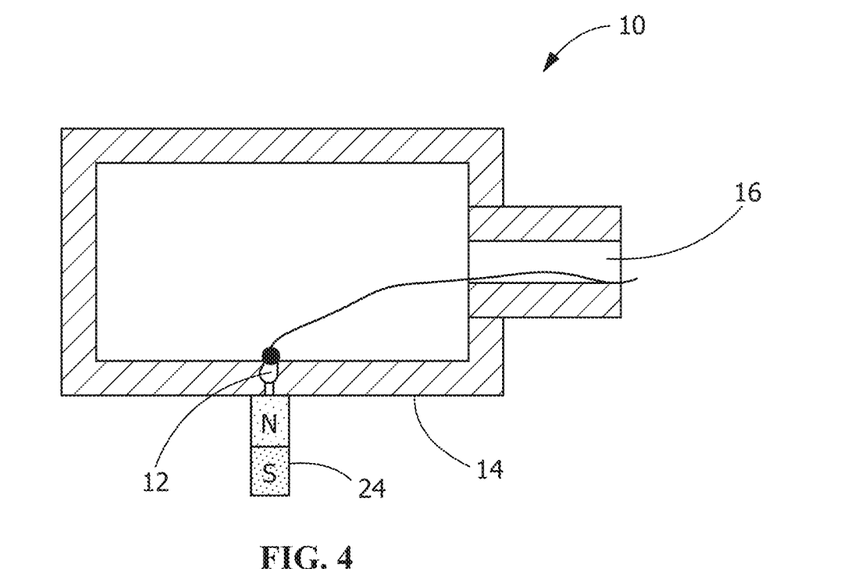
FIG. 4 is a cross-section of the component of FIG. 3, depicted the braze alloy of the present invention being manipulated with a magnet to locate the braze alloy of the present invention adjacent the defect.

After a determination that defect 12 detected by a non-destructive test method requires a repair, in this example, porosity detected by hydrostatic testing by pressurizing the pressure boundary, nozzle wall 14 comprising a high temperature material as discussed above, magnetic braze material 20 is introduced into nozzle 10 through nozzle opening 16. While magnetic braze material 20 may assume any form, the form that is selected may be dictated by the access available through nozzle opening 16. If nozzle opening 16 is sufficiently large to allow braze foil or braze paste to be introduced, then foil or paste may be an acceptable form. If the nozzle opening is more restricted, or if the defect is located a large distance from the nozzle opening, a different form may be appropriate. Thus, magnetic balls chips or even a paste having low viscosity may be introduced. In FIG. 3, magnetic braze balls are introduced, the braze balls being attached to a thread and introduced into nozzle 10 through nozzle opening 16 using pressurized air. In whatever form braze material 20 is introduced, if it cannot be placed into the proper position manually, braze material 20 may be moved into its proper location adjacent 12 defect, using a magnet, as shown in FIG. 4.

Figure 5:
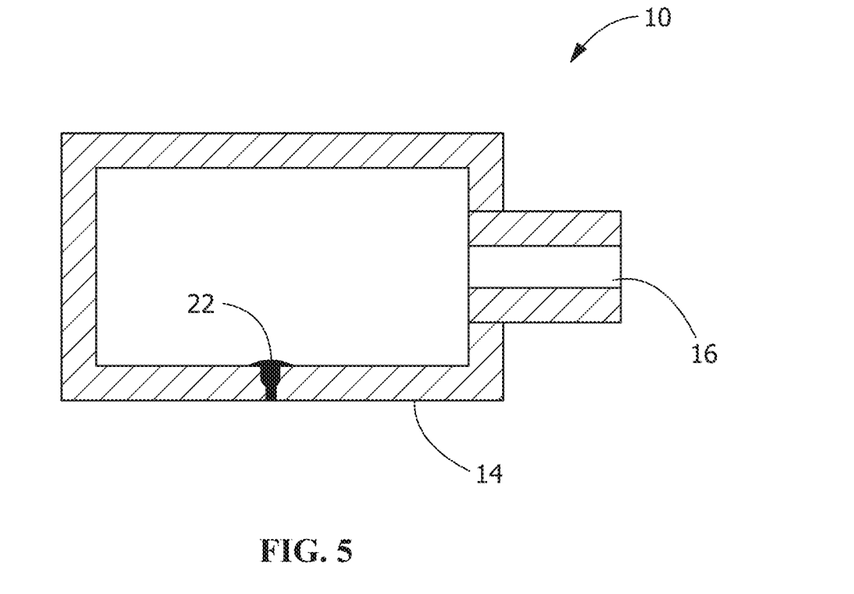
FIG. 5 is a cross-section of the component of FIG. 4 depicted the removal of the defect by brazing.

After braze alloy 20 has been moved into position, the brazing operation may be completed by heating braze alloy 20 to its brazing temperature. The completed braze repair is depicted in FIG. 5, which shows melted braze alloy having flowed into defect 12.

The preferred method of accomplishing the brazing operation, after placing braze material 20 into position, is to heat the component that requires brazing to a temperature above its brazing temperature, which brazing temperature should be sufficient to cause braze material 20 to flow, but not so high as to cause the base material of the component requiring brazing, in FIGS. 2-5 nozzle 10 to melt. As noted before, this can be accomplished by including a melting point depressant, such as boron, in braze material 20 so that braze material flows in the temperature range of 1850-2100° F.

Preferably, the brazing operation is done under a vacuum or under a non-oxidizing atmosphere, but may be done in air if neither a vacuum nor a non-oxidizing atmosphere is feasible. In one example, the component such as nozzle 10 may be placed in a furnace the braze material 20 may be maintained in position with a magnetic or may be moved into position after the component has been moved into position. The proper non-oxidizing atmosphere may be obtained by drawing a vacuum of at least about $5 \times 10^{-4}$ Torr or lower, or by purging the furnace with nitrogen (N) or an inert gas such as helium (He) or argon (Ar). The furnace may then be heated to the brazing temperature and held at that temperature until the braze material flows into defect 12.

Alternatively, the interior of the component may be purged with an atmosphere of N or an inert gas such as Ar or He when the size of the component requiring the braze repair is not conducive to furnace repair. The interior of the component may be sealed during the heating operation or the gas may be allowed to flow through the component at a rate that does not disturb the braze material. The component may be heated to the brazing temperature of the braze material by inductive heating, resistance heating, radiant heating (such as with quartz lamps) or with any other heating method that is suitable for brazing.

During the brazing operation, molten braze material 22 flows into defect 12 that is open to the surface of the component, nozzle wall 14 in FIGS. 2-5, by capillary action. Of course, on cooling, molten braze material 22 will solidify within defect 12 so that any leak path will be closed. However, even as braze alloy begins to solidify, the melting point depressant, here B, will begin to migrate from the braze alloy into the component base material, thereby raising the melting point of the braze alloy, which also may contribute to solidification of the braze material even under isothermal conditions.

Figure 6:
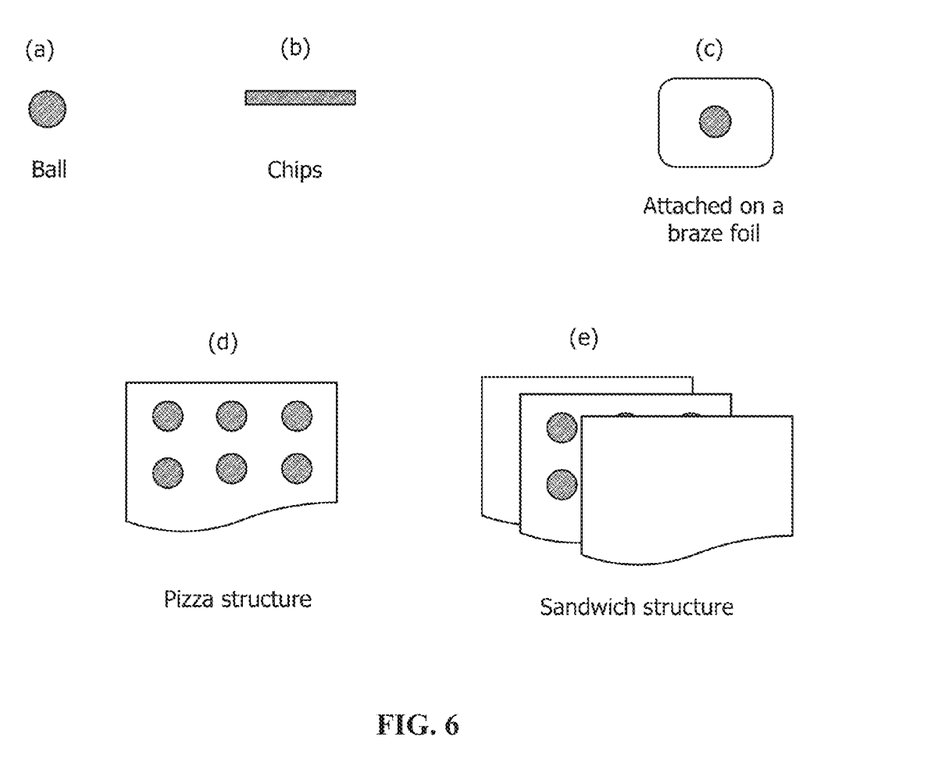
FIG. 6 depicts various forms of the braze material of the present invention.

Magnetic braze material may be moved into position adjacent a defect by use of a magnet having sufficient magnetic strength to penetrate through a boundary of the component, such as nozzle wall in FIGS. 2-5. The magnetic braze material may be provided as balls, powder, chips or as particulate attached on or in a braze foil, as shown in FIG. 6(a)-(c). The magnetic braze material may be attached into or on braze foil as a pizza structure as shown in FIG. 6(d). In another variation, as shown in FIG. 6(e), the magnetic braze material may be included as a pizza structure embedded between braze foil, as shown in FIG. 6(e) to form the sandwich structure. The braze foil and the structure secured to it may or may not have the same composition and may or may not have the same liquidus temperature. One component may melt before the brazing temperature is reached, if desired.

In certain circumstances, the foil may include an activated adhesive to maintain the foil in position, the adhesive being activated once the foil is moved into position. In still another variation, the magnetic braze material may be mixed with a putty or paste that is fluid enough to be moved by a magnet. The paste of putty includes an adhesive. After the putty or paste is moved into position, the adhesive is allowed to cure. Curing may be accomplished by simple drying, or by exposing the adhesive to a frequency of the electromagnetic spectrum that will cure the adhesive. The adhesive is designed to vaporize or burn out before the braze temperature is reached on heating.

In another variation, the braze material may be provided as a two component system, either as powder or as part of a putty or paste system as described above. In this system, one powder component, a low melt component, melts before the other component, the high melt component. Once the brazing temperature is reached, both components are liquid and mix together to form a braze material of substantially uniform composition, which flows into the defect.

Figure 7:
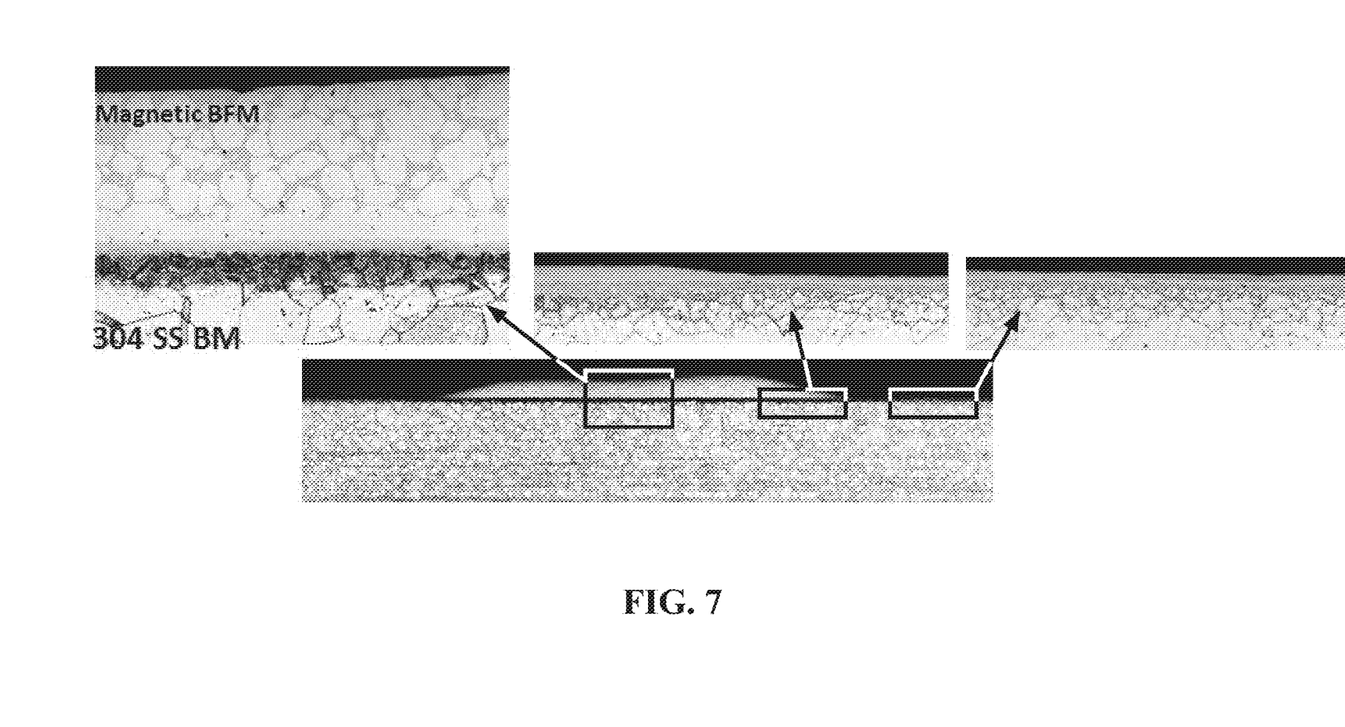
FIG. 7 is a cross-section of braze material of the present invention brazed onto 304 stainless steel, the figure showing microstructures in three location of the braze material, the fusion region and the 304 stainless base material.

FIG. 7 depicts a microstructure of a stainless steel substrate (304 stainless) brazed using a magnetic braze foil of the present invention. I FIG. 7 the lower micrograph has a magnification of 25×, while the upper micrographs have a magnification of 200×. FIG. 7 shows three separate regions. There are three regions, stainless base material, magnetic braze alloy and a region of bonding. As is evident, there is complete bonding in the bond region, but there are some enlarged grains in this region.

Figure 8:
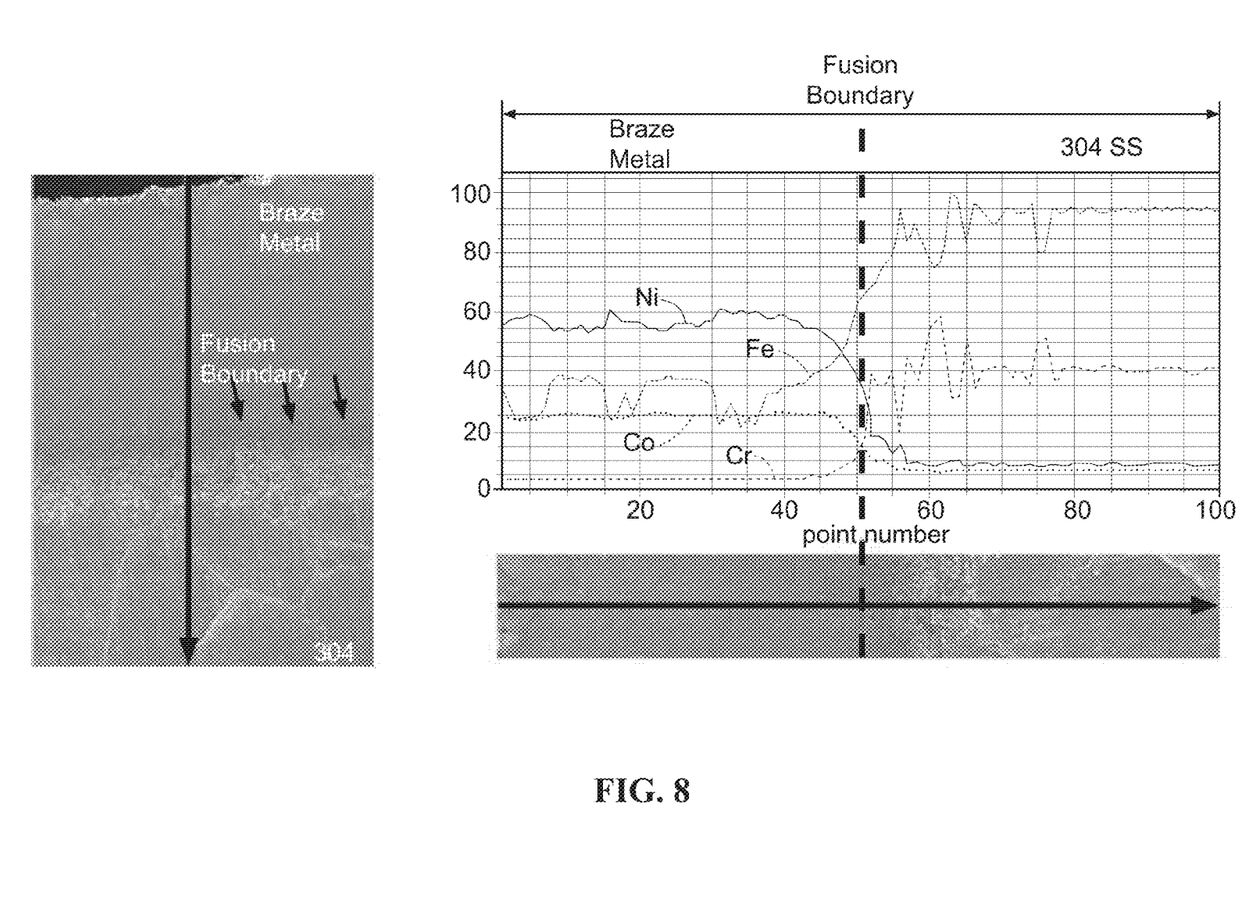
FIG. 8 depicts a microprobe measurement traversing the braze material, the fusion region and the 304 stainless base material showing chemistry variations.

FIG. 8 also is a representation of a stainless steel substrate (304 stainless) brazed using a magnetic braze foil of the present invention. The micrographs have a magnification of 1000×. In this FIG. 8, a microprobe chart (right) shows the change in chemistry that occurs as the structure is traversed from braze metal to the braze bond boundary to the base stainless steel substrate. As the braze bond boundary is approached from the braze alloy side, the Ni content decreases sharply as the braze bond boundary is approached and the Fe content increases as one moves from the braze bond boundary into the stainless steel. In a like manner, the Cr content also increases sharply as the braze bond boundary is approached from the braze material side, as the 304 stainless has a higher Cr content than the braze material. The braze bond boundary is narrow, and the Ni, Fe and Cr gradients are relatively sharp on either side of the braze bond boundary due to the chemistry differences between the braze material and the 304 stainless.

FIGS. 7-8 illustrate that the braze alloy can provide an effective braze bond zone between the braze materials and the base material. There is some mixing of chemistries in a narrow portion of the braze bond zone, but the braze bond zone will have a region of large grains.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:
1. A magnetic ternary braze alloy, comprising:
 a nickel-based braze alloy from the perminvar region of the nickel (Ni), iron (Fe), cobalt (Co) phase diagram, the braze alloy comprising, by weight percent
  about 8-45% Fe,
  0 to about 78% Co,
  about 0.5-5.0% of an element selected from the group consisting of boron (B) and silicon (Si) and combinations thereof;

the balance Ni,
the magnetic ternary braze alloy further including about 0.01-0.10% aluminum (Al) for oxidation resistance;
wherein the nickel-based braze alloy is characterized by a brazing temperature in the range of 1850-2100° F., and
wherein the nickel-based braze alloy is magnetic below its Curie temperature.

2. The magnetic ternary braze alloy of claim 1 further including about 0.01-0.10% titanium (Ti).

3. The magnetic ternary braze alloy of claim 1 further including about 6-13% chromium (Cr).

4. The magnetic ternary braze alloy of claim 1 wherein the element selected from the group consisting of B and Si and combinations thereof are included in the range of about 2.0-4.0%.

5. The magnetic ternary braze alloy of claim 4 wherein the element selected from the group consisting of B and Si and combinations thereof are included in the range of about 2.75-3.75%.

6. The magnetic ternary braze alloy of claim 1 wherein the braze alloy is characterized by wettability sufficient to flow into porosity having a size of 0.001 inches and larger.

7. The magnetic ternary braze alloy of claim 1 wherein the braze alloy is a foil.

8. The magnetic ternary braze alloy of claim 7 wherein the foil has a thickness of about 0.0002-0.008 inches.

9. The magnetic ternary braze alloy of claim 1 wherein the braze material is particulate material having a morphology selected from the group consisting of balls, chips, cylinders and powders.

10. The magnetic ternary braze alloy of claim 9 wherein the braze alloy powders are mixed with a pliable filler material to form a paste.

11. The magnetic ternary braze alloy of claim 8 wherein balls or cylinders comprising the braze alloy are captured within the foil.

12. The ternary braze alloy of claim 1 wherein the element selected from the group consisting of boron (B) and silicon (Si) is B.

13. The ternary braze alloy of claim 12 further comprising B in the range of 2.75-3%.

14. The ternary braze alloy of claim 1 wherein the element selected from the group consisting of boron (B) and silicon (Si) is Si.

15. The ternary braze alloy of claim 14 further comprising Si in the range of 2.75-3%.

16. A method for repairing a defect in a structure, comprising the steps of:
identifying a defect in a component, the defect being positioned in a hard to access location;
providing a magnetic nickel-based braze alloy from the perminvar region of the Ni, Fe, Co phase diagram, the braze alloy including, by weight percent
about 8-45% Fe,
about 0-78% Co;
about 0.5-5.0% of an element selected from the group consisting of B and Si and combinations thereof;
the balance Ni,
the magnetic ternary braze alloy further including about 0.01-0.10% aluminum (Al) for oxidation resistance;
wherein the nickel-based braze alloy is characterized by a brazing temperature in the range of 1850-2100° F., and
wherein the nickel-based braze alloy is magnetic below its Curie temperature;
adding the braze alloy to an interior of the component;
manipulating the braze alloy with a magnet so that it is positioned within the component at the defect;
placing the component in a furnace having a non-oxidizing atmosphere while maintaining the braze alloy in position;
heating the furnace to the brazing temperature of the braze alloy, wherein the braze alloy flows into the defect; and
cooling the component.

17. The method of claim 16 wherein the step of placing the component in a furnace having a non-oxidizing atmosphere includes placing the component in a furnace purged with a nitrogen atmosphere.

18. The method of claim 16 wherein the step of placing the component in a furnace having a non-oxidizing atmosphere includes placing the component in a furnace purged with an inert gas atmosphere.

19. The method of claim 16 wherein the step of placing the component in a furnace having a non-oxidizing atmosphere includes placing the component in a vacuum furnace and drawing a vacuum.

20. The method of claim 16 wherein the step of identifying a defect in a component, the defect being positioned in a hard to access location includes identifying a defect within an interior diameter of a nozzle.

21. The method of claim 16 wherein the step of identifying a defect in a component includes identifying a defect in a component wherein the component comprises a material selected from the group consisting of nickel-base alloys, cobalt-base alloys, iron-base alloys and combinations thereof.

22. The method of claim 16 wherein the step of identifying a defect in a component includes performing a pressurized leak test on the component and identifying areas of fluid leakage.

23. The method of claim 16 further including the step of inspecting the component to determine that the defect has been cured.

24. The method of claim 16 wherein the step of placing the component in the furnace and maintaining the braze alloy in position includes mixing the braze alloy with an adhesive and allowing the adhesive to dry, the adhesive characterized by a volatilization temperature below the brazing temperature of the alloy.

25. The method of claim 16 wherein the step of placing the component in the furnace and maintaining the braze alloy in position includes utilizing a magnet to maintain the braze alloy in position, the magnet having a Curie temperature below the Curie temperature of the braze alloy.

\* \* \* \* \*